April 15, 1952  F. C. JOHNSON  2,593,033
RETAINING MEANS FOR ELECTRICAL OUTLET BOXES
Filed June 27, 1950
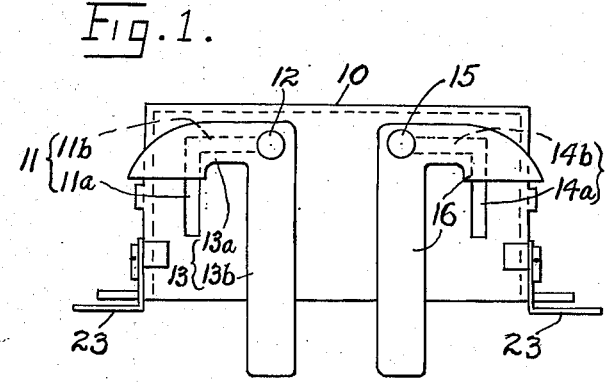
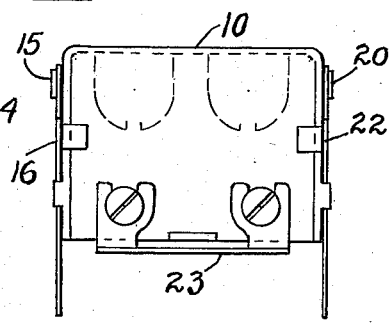
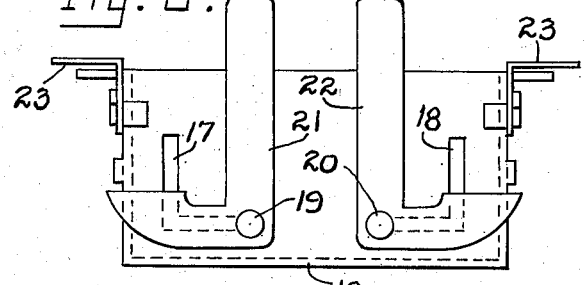
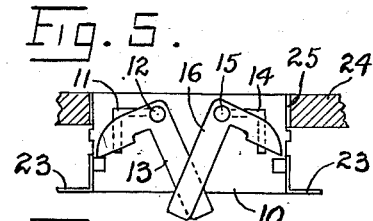
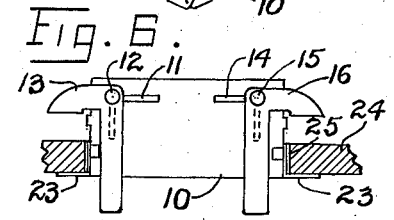
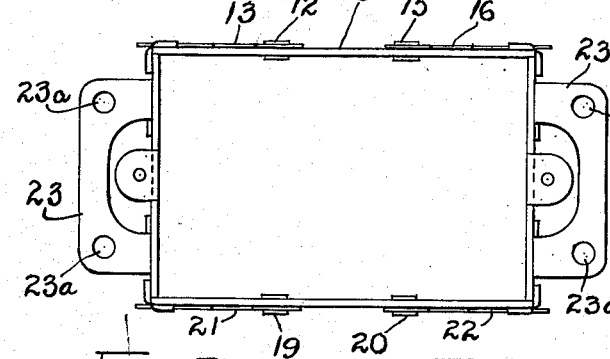
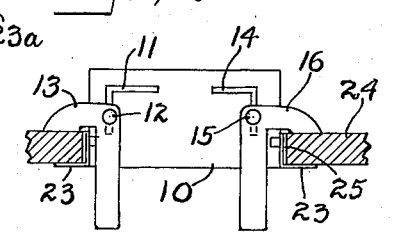
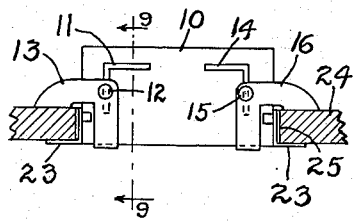
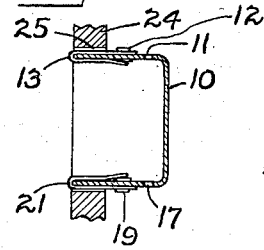
INVENTOR.
FREDERICK C. JOHNSON
BY *Albert C. Bell*
ATTORNEY.

Patented Apr. 15, 1952

2,593,033

UNITED STATES PATENT OFFICE 2,593,033

RETAINING MEANS FOR ELECTRICAL OUTLET BOXES

Frederick C. Johnson, Michigan City, Ind.

Application June 27, 1950, Serial No. 170,633

3 Claims. (Cl. 248—27)

1

The invention pertains to outlet boxes for electrical wiring systems, employed to house desired apparatus such as switches, outlet sockets, lamp sockets, etc., and to include said apparatus in the circuits of the wiring system, and also to house the connections of the several circuits of the system with each other, where desirable.

Outlet boxes referred to are sheet metal structures made in different ways to suit the preferences of the makers thereof, to house said apparatus and connections as a fire prevention measure, said boxes generally being mounted in the walls or ceilings of buildings and closed by metal cover plates according to the use made of the box in any case.

The older practice was and is to retain the outlet box in the wall, ceiling or other support, by screws extending through front angle members on the box and into the wall, ceiling or support. But because of a large percentage of the uses of outlet boxes being in plastered walls affording a precarious hold for the retaining screws the boxes in many cases have been easily pulled out, particularly when used to house outlet sockets for prong type plugs. Different types of retaining means have been proposed to cure the difficulty referred to, which means, in one way or another, engage the inner surface of the wall material to clamp said material between the retaining means and angle members on the box engaging the outer surface of the wall. Such retaining means have not been altogether satisfactory either because on the one hand of being too complicated to use effectively and too expensive to make, or on the other hand, because they were so simple and cheap that they failed to effectively accomplish their purpose.

It is the object of the invention to provide an improved construction of retaining means of the class referred to, that will not only effectively accomplish its purpose, but that will also be inexpensive to manufacture and that can readily be used, even by inexperienced persons.

It is a further object of the invention to provide an outlet box with sheet metal retaining members permanently attached to the box, so secured to the box as to not interfere in any way with inserting the box in a mounting opening, said members being movable on the box to positively engage an inner surface of the wall or support, and having portions readily movable by a workman into locking position to rigidly hold the box in place.

It is a further object of the invention to provide the top and bottom walls of the outlet box

2 with angular slots loosely containing rivets or studs secured to angular sheet metal retaining members movable on the top and bottom walls to clear the mounting opening in the wall or support, and then movable on the top and bottom walls to place laterally projecting end portions of said angular members tightly against the inner surface of the wall or support, and at the same time to project forwardly extending end portions of said angular members beyond the front end of the box for convenient folding over the edges of the box to lock said angular members in box-retaining position.

The invention will be best understood by reference to the accompanying drawings illustrating a preferred embodiment thereof, in which:

Fig. 1 shows in top plan view, an outlet box provided with the angular retaining members of the invention, Fig. 2 is a right hand end elevation of the structure shown in Fig. 1, Fig. 3 is a bottom view of the structure shown in Fig. 1, Fig. 4 is a front elevation of the structure shown in Figs. 1, 2 and 3, Fig. 5 shows the outlet box illustrated in Figs. 1-4 inclusive, in plan view to a reduced scale, as it is being inserted into an opening in a wall shown in horizontal, sectional view, Fig. 6 shows the outlet box of Fig. 5 completely inserted in the wall opening, with the front angle members of the box resting against the outer surface of the wall, and with the angular retaining members of the box moved laterally away from each other with their laterally extending end portions back of the inner surface of the wall, Fig. 7 is a view that is the same as Fig. 6 excepting that the angular retaining members of the box have been moved forwardly to effect firm engagement between the laterally projecting portions of said members and the inner surface of the wall, Fig. 8 is a view that is the same as Fig. 7 excepting that the forwardly projecting ends of the angular retaining members of the box have been folded around the front edge of the box to tightly hold the box in the wall, and Fig. 9 is a vertical, sectional view of the parts shown in Fig. 8 taken along the line 9—9 in Fig. 8.

Similar numerals refer to similar parts throughout the several views.

As shown in Fig. 1, a sheet metal outlet box 10 of known construction is additionally provided through its top wall with an angular slot 11 having a side portion 11a parallel with and spaced a short distance from the end wall of the box, and having also a back portion 11b parallel with and spaced a short distance from the back wall of the box, said portion 11b at its left hand end opening into the back end of the portion 11a. The slot 11 loosely contains a shouldered rivet or stud 12 rigidly secured to the mid-portion of an angular retaining member 13 of thin sheet metal, said member having a portion 13a extending laterally to the left away from the rivet or stud 12, and having also a portion 13b extending forwardly from said rivet or stud and projecting substantially beyond the front edge of the box when the rivet or stud 12 is in the slot portion 11b. The top wall of the box 10 has a second angular slot 14 through it, comprising portions 14a and 14b, which are the same as the slot portions 11a and 11b, excepting that the portion 14b extends towards the left hand end wall of the box from the portion 14a, instead of towards the other end of the box as does the slot portion 11b. The slot 14 loosely contains a shouldered rivet or stud 15 rigidly secured to the mid-portion of a second angular retaining member 16 which is the same as the retaining member 13, excepting that when mounted on the box 10, it is opposite hand to the member 13.

As shown in Fig. 3, the bottom wall of the box 10 has angle slots 17 and 18 through it which are similar to the angle slots 11 and 14 respectively, and have a relation to each other and to the bottom wall, similar to the relation of the slots 11 and 14 to each other and to the top wall of the box. The slots 17 and 18 contain shouldered rivets or studs 19 and 20 respectively similar to the rivets or studs 12 and 15, and rigidly secured to angular retaining members 21 and 22 of the same form as the retaining members 13 and 16 and having the same relation to the slots 17 and 18 that the retaining members 13 and 16 have to the slots 11 and 14.

As shown in Figs. 2 and 4, the box 10 is provided in the usual manner with front angle members 23, provided as shown in Fig. 4, with holes 23a to receive retaining screws where and if it is desired to retain the box in place in that manner.

In Figs. 5 to 9 inclusive, the procedure employed in mounting the box 10 shown in Figs. 1 to 4 inclusive, for use in a wall, is illustrated. A wall 24 is shown in sectional view in these figures, having an opening 25 to receive the box. In inserting the box into a wall opening, the angular retaining members are all moved as far as possible away from the end walls of the box and towards each other, as shown for the retaining members 13 and 16, with the forwardly extending ends of said retaining members respectively overlapping each other a small amount, to place the outer ends of the laterally extending portions of said retaining members just within the end outlines of the box. In this condition, the box 10 is pressed into the opening 25 until the angle members 23 rest firmly against the outer surface of the wall 24 as shown in Fig. 6. With the box in the position shown in Fig. 6, the two retaining members on each of the top and bottom walls of the box, are moved away from each other by their forwardly projecting ends, as far as their studs or rivets will permit, in the corresponding slots through the top and bottom walls of the box, as shown for the retaining members 13 and 16 in Fig. 6; this places the studs or rivets of the retaining members, in line with the portions of the slots parallel with the end walls of the box, with the outer lateral ends of the retaining members projecting substantially over the rear surface of the wall 24. Then, by means of the forwardly projecting ends of the retaining members, each of the retaining members is pulled forwardly until its laterally projecting portion firmly engages the back surface of the wall 24, as shown for the retaining members 13 and 16 in Fig. 7, the angle members 23 of the box being at the same time held firmly against the front or outer surface of the wall 24. Then, with the angle members 23 still held firmly against the outer surface of the wall 24, each of the retaining members is pulled forwardly to insure firm contact between its laterally projecting portion and the rear surface of the wall 24, and the forwardly projecting end portions of all of the retaining members are bent tightly around the adjacent upper and lower front edges of the box, to lie closely against the inner surfaces of its top and bottom walls, as shown for the retaining members 13 and 16 in Fig. 8, and for the retaining members 13 and 21 in Fig. 9.

Mounting the outlet box in an opening as described, prevents displacement of the box from the opening, and at the same time provides for equally effective engagement of the retaining members with walls of substantially different thicknesses, ranging from thin wall board to thick plastered walls. The invention also prevents removal of the retaining devices from the outlet box, thus insuring that they will be available in proper relation to the box when needed. Furthermore, the four retaining members for each box may be made as identical parts by the same dies, the rivets or studs are identical parts, and the slots through the top and bottom walls of the box require but a single punch and die successively used for the four different slot positions, all of which contributes to the economical production of the invention and its effective use.

While I have shown my invention in the particular embodiment described, I do not limit myself thereto as I may employ equivalents thereof without departing from the scope of the appended claims.

Having thus described my invention, what I claim is:

1. Means for securing an electrical outlet box in a mounting opening through a support, including in combination a sheet metal outlet box having top, bottom, end and back walls and open at its front side, said top and bottom walls having similar angle slots therethrough, each of said slots having portions at substantially a right angle to each other, one of said portions of each slot being substantially parallel with and adjacent the back wall of the box and the other portion of each of said slots being substantially parallel with and adjacent an end wall of the box, an angular retaining member of thin sheet metal for each of said slots, each of said retaining members having two portions at substantially a right angle to each other, and a headed stud in each of said slots and rigidly secured to the mid-portion of a corresponding one of said retaining members, each of said retaining members in its rearmost position having one end portion projecting forwardly substantially in front of the front side of said box and having two limiting positions laterally, one of said lateral positions of each of said retaining members placing the outer end of the laterally extending portion of said member within the end of the box wall supporting said retaining member and the other lateral position of said retaining member projecting said laterally extending portion substantially beyond the adjacent end wall of the box for engagement with the rear surface of the support containing said mounting opening, said retaining members in their forward positions holding said box in mounted position in said opening.

2. Means for securing an electrical outlet box in a mounting opening through a support, including in combination a sheet metal outlet box having top, bottom, end and back walls and open at its front side, said top and bottom walls having similar angle slots therethrough, each of said slots having portions at substantially a right angle to each other, one of said portions of each slot being adjacent the back wall of the box and the other portion of each of said slots being adjacent an end wall of the box, an angular retaining member of thin sheet metal for each of said slots, each of said retaining members having two portions at substantially a right angle to each other, and a headed stud in each of said slots and rigidly secured to the mid-portion of a corresponding one of said retaining members, each of said retaining members in its rearmost position having one end portion projecting forwardly substantially in front of the front side of said box and having two limiting positions laterally, one of said lateral positions of each of said retaining members placing the outer end of the laterally extending portion of said member within the end of the box wall supporting said retaining member and the other lateral position of said retaining member projecting said laterally extending portion substantially beyond the adjacent end wall of the box for engagement with the rear surface of the support containing said mounting opening, said outlet box having members for limiting the insertion of the outlet box into and through said mounting opening, each said forwardly projecting end portion having a first position for moving its laterally projecting portion into engagement with the rear surface of the support containing said mounting opening and having a second position folded around the front edge of the outlet box to maintain said engagement.

3. Means for securing an electrical outlet box in a mounting opening through a support, including in combination a sheet metal outlet box having top, bottom, end and back walls and open at its front side, said top and bottom walls having similar slots therethrough, each of said slots having two portions at an angle to and opening into each other, one of the portions of each of said slots being adjacent the back wall of the box and the other portion of said slot being adjacent an end wall of the box, an angular retaining member for each of said slots, and a retaining stud in each of said slots and rigidly secured to a corresponding one of said retaining members, each of said retaining members including a first portion extending forwardly and projecting beyond the front side of the box and including also a laterally extending portion having a first position for inserting the box into and through a mounting opening and having a second position for engagement with the rear surface of a support containing said mounting opening, the forwardly extending and projecting portion of each of said retaining members comprising a means for moving the laterally extending portion of said member from one to the other of its said positions and also a means for holding said member in box-retaining position in said mounting opening.

FREDERICK C. JOHNSON.

REFERENCES CITED

The following references are of record in the file of this patent:

UNITED STATES PATENTS

| Number | Name | Date |
|---|---|---|
| 1,793,187 | Neal | Feb. 17, 1931 |
| 2,003,909 | Stark | June 4, 1935 |
| 2,299,696 | Gregersen | Oct. 20, 1942 |
| 2,456,450 | Sauter | Dec. 14, 1948 |